March 28, 1961 W. D. GOODALE, JR., ET AL 2,977,419

TELEPHONE PAY STATION

Filed Dec. 24, 1956 2 Sheets-Sheet 1

INVENTORS W. D. GOODALE, JR.
W. PFERD

BY R. C. Perry

ATTORNEY

INVENTORS W. D. GOODALE, JR.
W. PFERD
BY R. C. Terry
ATTORNEY 2,977,419
Patented Mar. 28, 1961

2,977,419

TELEPHONE PAY STATION

Walter D. Goodale, Jr., Chatham, and William Pferd, Berkeley Heights, N.J., assignors to Bell Telephone Laboratories, Incorporated, New York, N.Y., a corporation of New York Filed Dec. 24, 1956, Ser. No. 630,341

9 Claims. (Cl. 179—6.3)

This invention relates to telephone pay stations and more particularly to telephone pay stations requiring the deposit of a predetermined amount of money before permitting the completion of a connection to a called party.

The current trend in the telephone industry is toward more automatic operation of telephone equipment. Recent developments in the communications and switching arts have made feasible telephone central offices which utilize electronic equipment in place of more costly and more space consuming mechanical equipment. The rather special power and circuit requirements of systems employing such electronic equipment, however, bring forth the need for special substation equipment which will be compatible with such requirements.

An object of the present invention is the provision of an efficient telephone pay station capable of operation with electronic central office equipment.

A primary requirement of substations to be utilized in connection with electronic central offices is that they may be operated on small amounts of current. The reason for this lies in the physical limitations of electron tubes and solid state devices such as transistors which inherently provide rather small current outputs unless they have been multipled. In addition to this of course, is the fact that a low current drain results in much more efficient utilization of telephone lines.

Another object of the present invention is, therefore, the provision of a telephone pay station that requires small operating currents.

A further advantageous development in telephone pay stations is the elimination of ground paths from the circuitry. Prior art telephone pay stations frequently made use of a circuit between the tip conductor and ground for verifying the deposit of an initial amount before permitting a customer to place his call. Another function of this tip-to-ground circuit was the control of the coin disposal mechanism for either the collection or refund of deposits. When using a circuit of this type to control the coin disposal mechanism at the telephone pay station, the central office effected the control by means of current pulses of opposite polarities. Applications of pulses of one polarity resulted in refund of the deposit and applications of pulses of the opposite polarity resulted in collection of the deposit. The use of such ground connections necessitated the acceptance of several undesirable factors that had to be considered when designing pay stations, among these were the effects of direct-current ground potentials and the problem of noise resulting from any unbalance of the lines. A further undesirable characteristic of many grounded pay stations, and one which affected adversely the collection of revenue, was that unscrupulous parties frequently were able to complete a path to ground at the pay station, thereby fraudulently leading the central office operator or automatic ground checking equipment to conclude that sufficient deposit had been made to cover the charges for making the desired call.

A further object of the present invention is the provision of an improved ungrounded telephone pay station which is less susceptible to the fraudulent acts of unscrupulous parties.

In present day telephone systems there are three types of calls which may be originated by the user of a telephone pay station; these are local calls, multi-unit calls, and toll calls. The most commonly employed call of these three is that referred to as a local call. Such a call requires the deposit of one or more coins totaling in value an initial or minimum rate and the customer, after the initial deposit, may complete a call to any subscriber within a specified area by dialing the called party's directory number. The cost of establishing a call of this type from the standpoint of the telephone company is to a large extent proportional to the time required for the actual connection of parties and the collection of the proper fee. On manually controlled calls this cost is primarily accrued by operator time; however, even in automatic operation the time during which equipment is employed is an important economic factor. With automatic operation the cost arises out of the necessity of providing adequate numbers of units of equipment for giving prompt service to a given number of pay station installations, a significant factor being that such units may be under seizure for varying lengths of time in the establishment of connections to called parties, during which intervals they are unavailable for the processing of other calls. Among the necessary operations performed by the central office for each call are; verification of the initial deposit, determination of the type of call, collection or refund of the initial deposit, and establishment of the desired connection. By eliminating the need for central office supervision of deposit refund, a reduction in both central office equipment and time is realized.

Still another object of the present invention is the provision of an ungrounded telephone pay station which eliminates the need for central office supervision of deposit refund.

The above objectives are achieved in the present invention through the utilization of novel deposit control circuitry connected in parallel with the transmission and receiving equipment and operated by a reversal of the line current. The invention resides basically in the provision of a power supply located at the pay station, in conjunction with a customer controlled deposit refund arrangement and a low current means controlled from the central office for deposit collection. Several of the more prominent features of the invention are discussed hereinafter.

The operations involved in the use of telephone pay stations which require the largest expenditures of current for short periods of time are those which concern the control of the coin disposal mechanism. Elimination of direct control of this mechanism by the central office will greatly reduce the current rating of a telephone pay station.

A feature of the present invention relates to the provision of a direct-current potential source located at the telephone pay station and utilized for controlling the coin disposal mechanism, the circuitry associated with this potential source and coin disposal mechanism providing both remote control of the mechanism from the central office and local control by the customer.

A more specific feature of the present invention relates to the provision in the coin collector of a telephone pay station of means for direct customer control over the refund of deposited coins.

A further feature of the present invention relates to the provision of low current means located at the substation and controlled from the central office for energizing the coin disposal mechanism to collect all deposited coins.

In addition to the above-mentioned features, the present invention, realizing the need for the ungrounded control of the telephone pay station, provides means in the case of calls of the aforementioned local type for ascertaining whether or not overtime deposit has been made. This means comprises a detection circuit utilized by reversal of the line current.

The foregoing, as well as additional objects and features of this invention, will be more clearly understood and appreciated from the following description to be considered in connection with the drawings, wherein.

Figure 1:
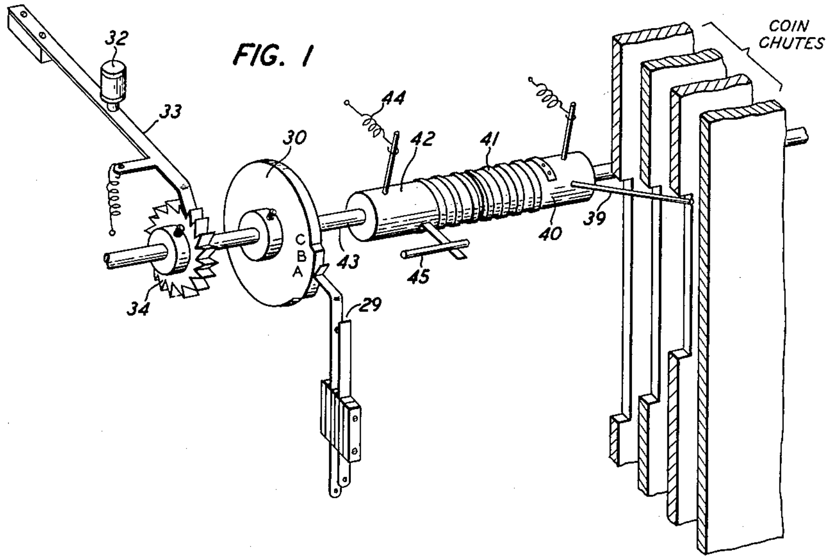
Fig. 1 is a perspective view of a coin totalizing device the resetting of which is controlled electromechanically.
Figure 2:
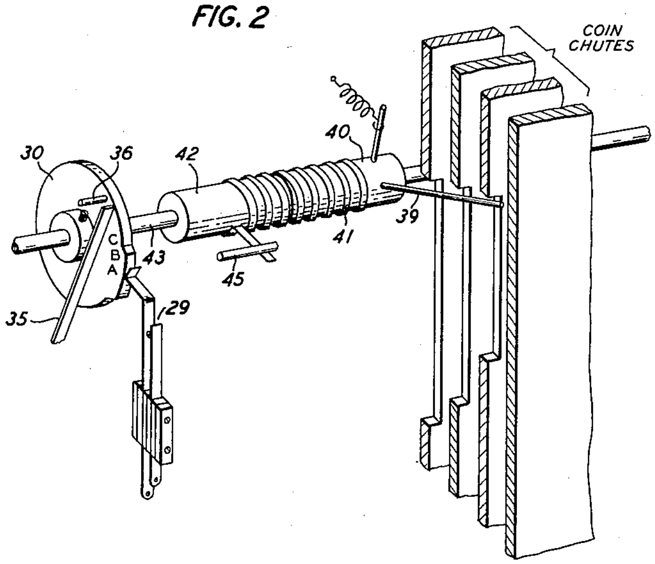
Fig. 2 is a perspective view of a similar coin totalizing device which is reset directly by the operation of the coin disposal mechanism.
Figure 3:
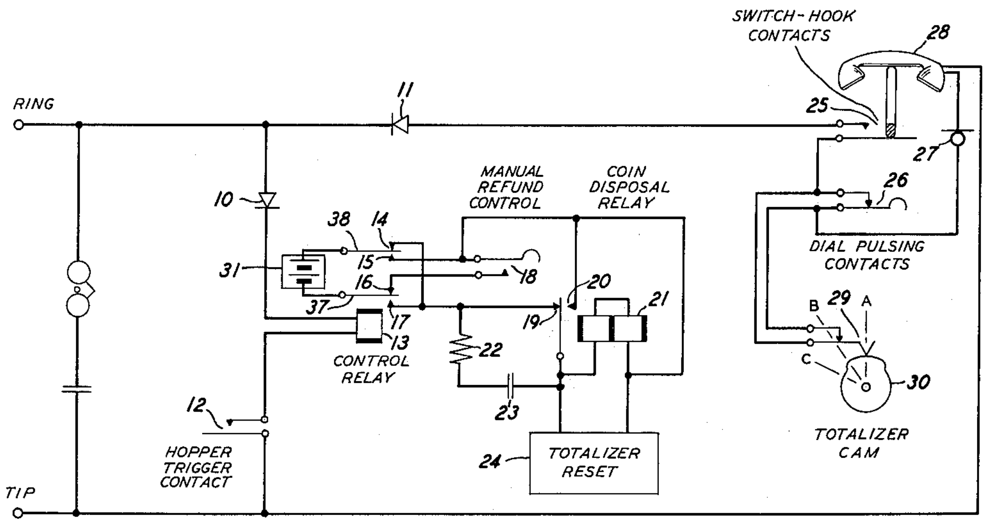
Fig. 3 shows a circuit schematic of a telephone pay station employing an illustrative embodiment of the present invention wherein manual control of the coin disposal mechanism is depicted.

Referring to the drawings, a specific illustrative embodiment of the invention is disclosed in Fig. 3. The operation of initial deposit control is performed in this embodiment of the invention by a coin totalizing device of the type described in the copending application of W. Pferd, Serial No. 518,070, filed June 27, 1955. This coin totalizing device is illustrated in Figs. 1 and 2 and it will be noted that these figures differ only with respect to the means employed for resetting the totalizing device. The reset means shown in Fig. 1 comprises spring 44 which acts to restore the totalizing device to a no deposit position when magnet 32 lifts check pawl 33 from engagement with ratchet wheel 34 and is similar to that shown in the aforementioned application, whereas the reset means shown in Fig. 2, comprising member 35 and pin 36 is similar to that shown in the copending application of W. D. Goodale, Jr.-W. Pferd, Serial No. 591,116, filed June 13, 1956. The construction and operation of the coin totalizing device and the illustrated reset means are adequately described in the aforementioned applications, and the disclosures thereof are incorporated herein by reference.

For the purpose of understanding this invention, it need merely be noted that deposit of a predetermined amount, in this case the initial rate charge, will operate to open contacts 29. The illustrated totalizing device may be designed to accept and totalize coins of any denomination. As described in the aforementioned applications as coins are deposited in the coin chutes, lever 39 is depressed and control cam 30 is rotated clockwise a number of degrees proportional to the amount of deposit under control of a band clutch mechanism comprising driving member 40, helical spring 41, and driven member 42 to which shaft 43 is secured. Member 45 is a release finger for helical spring 41 which permits this spring to loosen following registration of the amount of deposit. Thus, assuming that contacts 29 are to be opened following a deposit of ten cents, if a five-cent coin is deposited control cam 30 will be rotated to position B. Deposit of a second five-cent coin will rotate cam 30 further to position C in which position contacts 29 will be allowed to open. Had a ten-cent coin been initially deposited, control cam 30 would immediately have been rotated in a single operation to position C. Utilization of a device of this nature provides a very flexible means of deposit control. As is readily apparent, control cam 30 may be rotated either clockwise or counterclockwise with respect to shaft 43 by making a simple mechanical adjustment. Such rotation will result in the need for making less or more deposit, respectively, to open contacts 29.

Either of the illustrated reset means may be employed with the totalizing device. The means in Fig. 1 requires electrical connection into the coin disposal control circuit in order to energize magnet 32 whenever the coin disposal relay is operated; on the other hand, the reset means shown in Fig. 2 requires only a purely mechanical connection since, as set forth in the aforementioned Goodale et al. application member 35 is an extension of a well-known coin disposal relay armature which upon every operation of the relay is deflected to the left to bear against pin 36, and in this fashion resets the totalizer to its initial state.

Considering Fig. 3 specifically, it will be noted that the totalizer cam 30 which controls contacts 29 as shown in Figs. 1 and 2 is therein illustrated. A conventional telephone set comprising handset 28, switchhook contacts 25, dial pulsing contacts 26, and coin signaling device 27 is depicted in the right-hand portion of this figure, and bridged across the ring and tip conductors of the pay station will be found control relay 13 which is energizable by a positive potential between the ring and tip conductors via diode 10 and hopper trigger contacts 12. Energization of this relay activates armatures 37 and 38, causing closure of contacts 15 and 17 and opening of contacts 14 and 16. As shown, coin disposal relay 21 may be connected to direct-current source 31 in either of two fashions. If control relay 13 is energized, the coin disposal relay 21 will be connected through contacts 15 and 17 to source 31 with a polarity dictating collection of the deposited coins, whereas operation of manual refund control 18 will connect the coin disposal relay 21 to source 31 via contacts 14 and 16 with a polarity which causes the refund of deposited coins.

It is desired to have the coin disposal relay perform its assigned operation, either refund or collection of deposited coins, when power is applied to it only for a short interval of time. This is accomplished in a conventional fashion by utilizing contacts 19 and 20 to short out the windings of the relay mechanism following energization. This makes use of the inductance of the winding to retard the deenergization. Block 24, entitled "totalizer reset," will be noted to be electrically connected in parallel with operating windings of coin disposal relay 21. If it is considered that the arrangement of Fig. 1 is being employed, this block will be representative of electromagnet 32. However, if it is considered that the arrangement of Fig. 2 is being employed, this block is merely symbolic of the mechanical operation which resets the totalizer whenever the coin disposal relay 21 is energized.

Before proceeding further, consideration should be given to the operation of hopper trigger contacts 12. These contacts are of the conventional type found in many well-known coin collection devices. They are controlled by a lever or similar member inserted into the coin chute of the collector that is tripped whenever a coin is deposited. Having been tripped, contacts 12 will close and remain closed until the coin disposal relay is operated.

In order to describe the actual operation of the circuit shown in Fig. 3, it will be assumed that the initial rate charge is ten cents and that the additional charge necessary to continue a local call into overtime is five cents. In relation to the coin totalizing equipment, therefore, the deposit of a five-cent coin will cause rotation of totalizer cam 30 to position B and contacts 29 will remain closed. Deposit of an additional five-cent coin will result in rotation of totalizer cam 30 to position C in which position contacts 29 are opened.

To initiate a call, the customer removes handset 28 from its cradle, thereby closing switchhook contacts 25 and establishing a current path between the ring and tip conductor in which a normal current flow is produced by applying negative voltage polarity to the ring conductor. This current path consists of diode 11 which blocks current when positive voltage polarity is applied to the ring conductor, switchhook contacts 25, dial pulsing contacts 26 and contacts 29 in parallel, signaling device 27, and handset 28. The establishment of this current path indicates to the central office in any well-known manner that the particular pay station actuated by the customer is desirous of service and a dial pulse receiving circuit will be connected thereto. The customer, however, is unable to place his call until the initial deposit is made because the dial pulsing contacts 26 are shorted out by contacts 29. If it is assumed that the deposit is made in five-cent increments, the first coin deposited will pass down the coin chute, closing hopper trigger contacts 12 and rotating totalizer cam 30 to position B. Deposit of the second coin will rotate cam 30 to position C and permit contacts 29 to open. Dial pulsing contacts 26 are now enabled and the customer may dial the directory number of the party with whom he desires to make a connection.

If the call is abandoned before actually dialing or before the called party answers, hang-up of the handset will open switchhook contacts 25, informing the central office that the pay station is again in an unused state. In order to obtain the coins deposited, the customer must close manual refund control contacts 18. These contacts may be controlled by a push-button located directly on the coin collector housing. Closure of these contacts activates the coin disposal relay 21 to refund the deposit by connecting voltage source 31 via contacts 14 and 16 and contacts 19 to the windings of the coin disposal relay. Upon energization of the relay, contacts 19 are opened and contacts 20 are closed to short the relay windings. As aforementioned, this procedure in the well-known fashion takes advantage of the inductance of the relay to slow down its deenergization. Resistor 22 and condenser 23 are employed in this circuit merely to reduce arcing at the contacts 19 due to opening. Clearly, the energization of coin disposal relay 21 concurrently causes resetting of the totalizing mechanism, resulting in the reclosure of contacts 29 and, as aforementioned, the reopening of hopper trigger contacts 12. The telephone pay station therefore is now ready to be reused and the customer has his money refunded.

Under the usual circumstances, if the call is to a party within the local area the connection to the called party will be made automatically, and immediately upon answer by the called party the polarity of the line voltage will be reversed. The current resulting from the reversed line voltage passes through diode 10, control relay 13, and hopper trigger contacts 12, energizing the control relay. This energization causes armatures 37 and 38 to close contacts 15 and 17 thereby connecting voltage source 31 to the coin disposal relay 21 in a manner designed to collect any deposited coins. The energization path in this situation may be traced from the positive terminal of the voltage source through contact 15 to coin disposal relay 21 and back via contacts 19 and 17 to the negative terminal of the supply voltage. Again, activation of the coin disposal relay causes the opening of contacts 19 and the closing of contacts 20 to provide the slow release feature and simultaneously resets the totalizing mechanism and hopper trigger contacts 12. Having collected the deposit, normal line voltage is reapplied and conversation is continued between the telephone set, the central office, and the called party over the circuit including diode 11.

If the customer refunds his deposit between the time of dialing and the moment the connection is completed, the reversal of line voltage upon answer by the called party will be met by an open circuit because the hopper trigger contacts 12 open upon every operation of coin disposal relay 21. Finding such an open circuit, the central office will immediately disconnect the customer. In this way, fraudulently obtaining a refund and still making a call is prevented.

Not infrequently, the time provided for a local call is insufficient for the needs of a customer and the call necessarily proceeds into overtime. If it be assumed that the time allotted for local calls is five minutes, at the end of approximately four and one-half minutes the central office will transmit an audible signal indicating to the customer that the time is about to expire. In order to continue the conversation beyond the five minute period, an additional deposit must be made. After five minutes the central office momentarily reverses the polarity between the ring and tip conductors. Deposit of the additional amount necessary to pay for overtime conversation, which it will be noted is actually the minimum amount possible to deposit in a standard coin collector, five cents, will be indicated by the existence of a complete circuit for the reverse current, because hopper trigger contacts 12 will have been closed by such deposit. Control relay 13 will be energized by the current passed by diode 10 and the deposited coin will be collected. The momentary interruption in a telephone conversation due to this testing and collection operation will be rather insignificant. Repetition of these operations on the part of both the customer and central office may result in telephone conversations of indeterminate length.

Should it be desired to place either a multi-unit call or a toll call from a telephone pay station incorporating this invention, operations similar to those previously discussed would be employed, the only difference being that an operator would need to intervene following dialing by the customer in order to determine the amount deposited. This determination is facilitated by the use of a coin signaling device 27 which may be a microphone for picking up the sound of the well-known gongs and chimes or any other audible signal arrangement. Following verification of sufficient deposit for the call requested, the central office will complete the desired connection, the deposit will be collected as discussed above, and conversation may ensue.

The above-detailed description is illustrative of a single embodiment of the present invention and it is not intended that the invention be limited to this embodiment. Other arrangements may be devised by those skilled in the art without any departure from the spirit of the invention.

What is claimed is:

1. A telephone pay station connected by a line to a central office comprising in combination, coin control means for refunding and collecting deposited coins, a source of potential at said pay station, means operable in response to a signal from said central office for connecting said source of potential to said coin control means to collect deposited coins, and means operable by a customer for connecting said source of potential to said coin control means to refund deposited coins.

2. A telephone pay station connected by a line to a central office comprising in combination, transmitting and receiving means operative upon application of a particular signal condition on said line by said central office, coin control means for refunding and collecting deposited coins, a source of potential, control means bridging said transmitting and receiving means and responsive to the application of a different signal condition on said line for connecting said source of potential to said coin control means to cause collection of said deposited coins, and manually operable contact means for connecting said source of potential to said coin control means to cause refund of said deposited coins.

3. A telephone pay station including a calling dial connected by a line to a central office comprising in combination, a coin totalizing device operable in response to the deposit of a predetermined minimum amount for enabling said dial, reset means for said coin totalizing device, a coin disposal mechanism for controlling disposal of deposited coins, means responsive to a signal on said line for operating said coin disposal mechanism to collect said deposited coins, manually controlled means for operating said coin disposal mechanism to refund said deposited coins, and means for simultaneously operating said reset means upon operation of said coin disposal means.

4. A telephone pay station including a calling dial connected by a line to a central office comprising in combination, a coin totalizing device operable in response to the deposit of a predetermined minimum amount for enabling said dial, reset means for said coin totalizing device, coin control means for refunding and collecting deposited coins, a source of potential, means operable in response to a signal on said line for connecting said source of potential to said coin control means to cause collection of said deposited coins, and manually operable contact means for connecting said source of potential to said coin control means to cause refund of said deposited coins, and means operable conjointly with said coin control means for operating said reset means.

5. A telephone pay station including a calling dial connected by a line to a central office comprising in combination, a coin totalizing device operable in response to the deposit of a predetermined minimum amount for enabling said dial, transmitting and receiving means operative upon application of a particular signal on said line by said central office, coin disposal means operative upon application of one potential condition to collect deposited coins and upon application of another potential condition to refund deposited coins, means operative in response to a different signal applied on said line by said central office to apply said one potential condition to said coin disposal means, manually operable means for applying said other potential condition to said coin disposal means, and reset means for said coin totalizing device operable upon application of either potential condition to said coin disposal means.

6. A telephone pay station including a calling dial connected by a line to a central office comprising in combination, a coin totalizing device operable in response to the deposit of a predetermined minimum amount for enabling said dial, transmitting and receiving means operative upon application of a potential condition of one polarity to said line, coin disposal means for controlling the disposal of deposited coins, circuit enabling means actuated by the deposit of a coin, means responsive to a potential condition on said line of a second polarity when said circuit enabling means is actuated for operating said coin disposal means to collect said deposited coins, manually operable means for operating said coin disposal means to refund said deposited coins, reset means for resetting said coin totalizing device, and means controlled by said coin disposal means when operated for resetting said circuit enabling means and operating said reset means.

7. A telephone pay station including a calling dial connected by a line to a central office comprising in combination, a coin totalizing device operable in response to the deposit of a predetermined minimum amount for enabling said dial, a transmitting and receiving circuit operative when a potential condition of one polarity is on said line, a coin collection circuit bridging said transmitting and receiving circuit and operative upon application of a potential condition of a second polarity to said line, circuit enabling means in said coin collection circuit actuated by the deposit of a coin, coin control means responsive to a potential of one polarity to collect deposited coins and to a potential of a second polarity to refund deposited coins, a source of potential providing two possible polarities, relay means in said coin collection circuit operable by said potential condition of said second polarity when said circuit is enabled for connecting said source of potential to said coin control means to collect said deposited coins, manually operable contact means for connecting said source of potential to said coin control means to refund said deposited coins, reset means for resetting said coin totalizing device, and means controlled by said coin disposal means when operated for resetting said circuit enabling means and operating said reset means.

8. A telephone pay station connected by a line to a central office comprising in combination, transmitting and receiving means in said station operative upon application of a particular signal condition on said line by said central office, coin control means in said station energizable to refund or collect deposited coins, coin collection means bridging said transmitting and receiving means and operable upon application of a different signal condition on said line for energizing said coin control means to collect said deposited coins, and manually operated means in said station for energizing said coin control means to refund said deposited coins.

9. A telephone pay station connected by a line to a central office comprising, a source of potential at said pay station, coin control means responsive to application of potential conditions to refund and collect deposited coins, transmitting and receiving means connected to said line, control means bridging said transmitting and receiving means and responsive to the application of a signal condition on said line for connecting said source of potential to said coin control means to collect said deposited coins, and manually operated contact means for connecting said source of potential to said coin control means to refund said deposited coins.

References Cited in the file of this patent

UNITED STATES PATENTS

| | | |
|---|---|---|
| 2,000,804 | Wehren | May 7, 1935 |
| 2,091,541 | Williams | Aug. 31, 1937 |
| 2,224,702 | Seidel | Dec. 10, 1940 |
| 2,750,447 | Lomax | June 12, 1956 |